No. 757,909. Patented April 19, 1904.

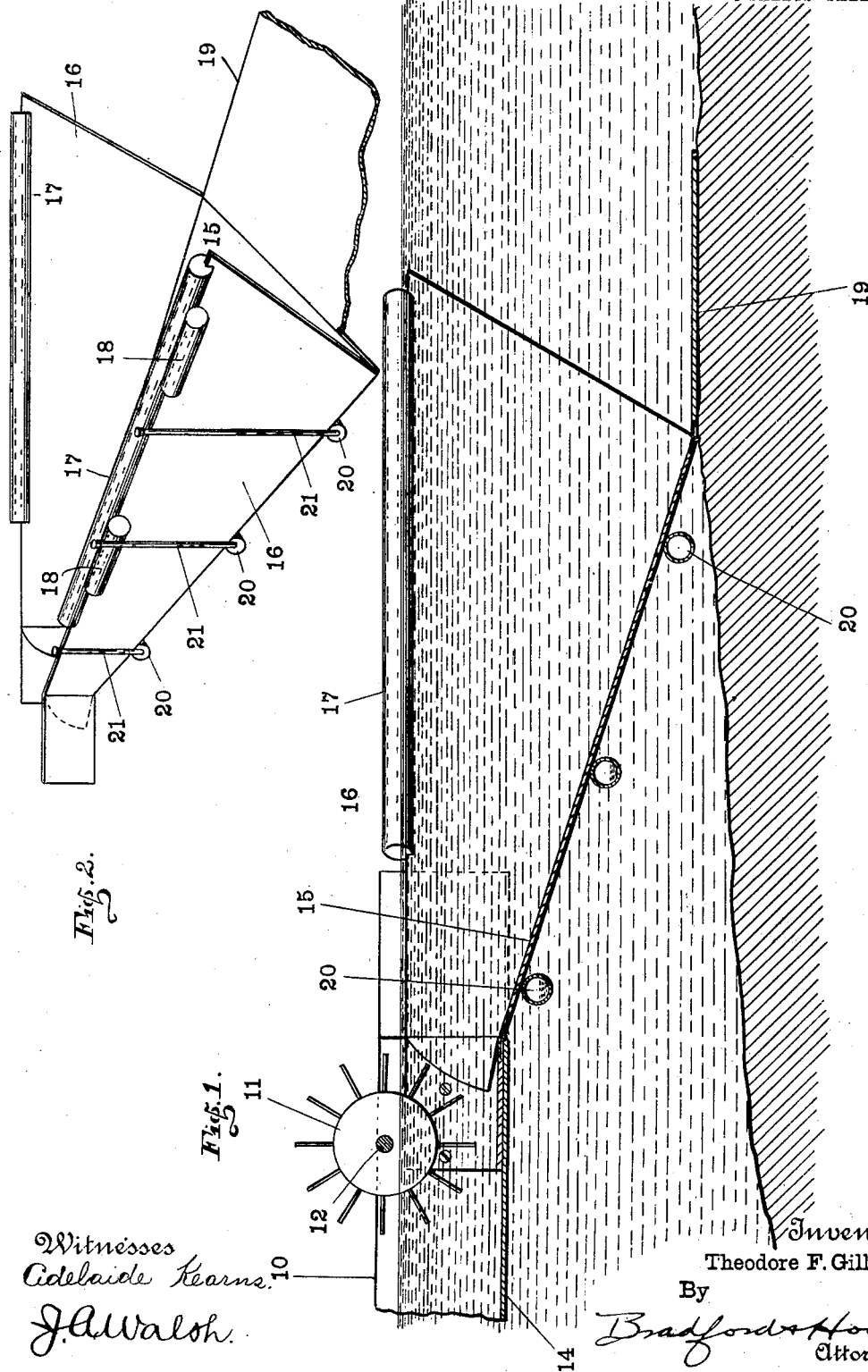

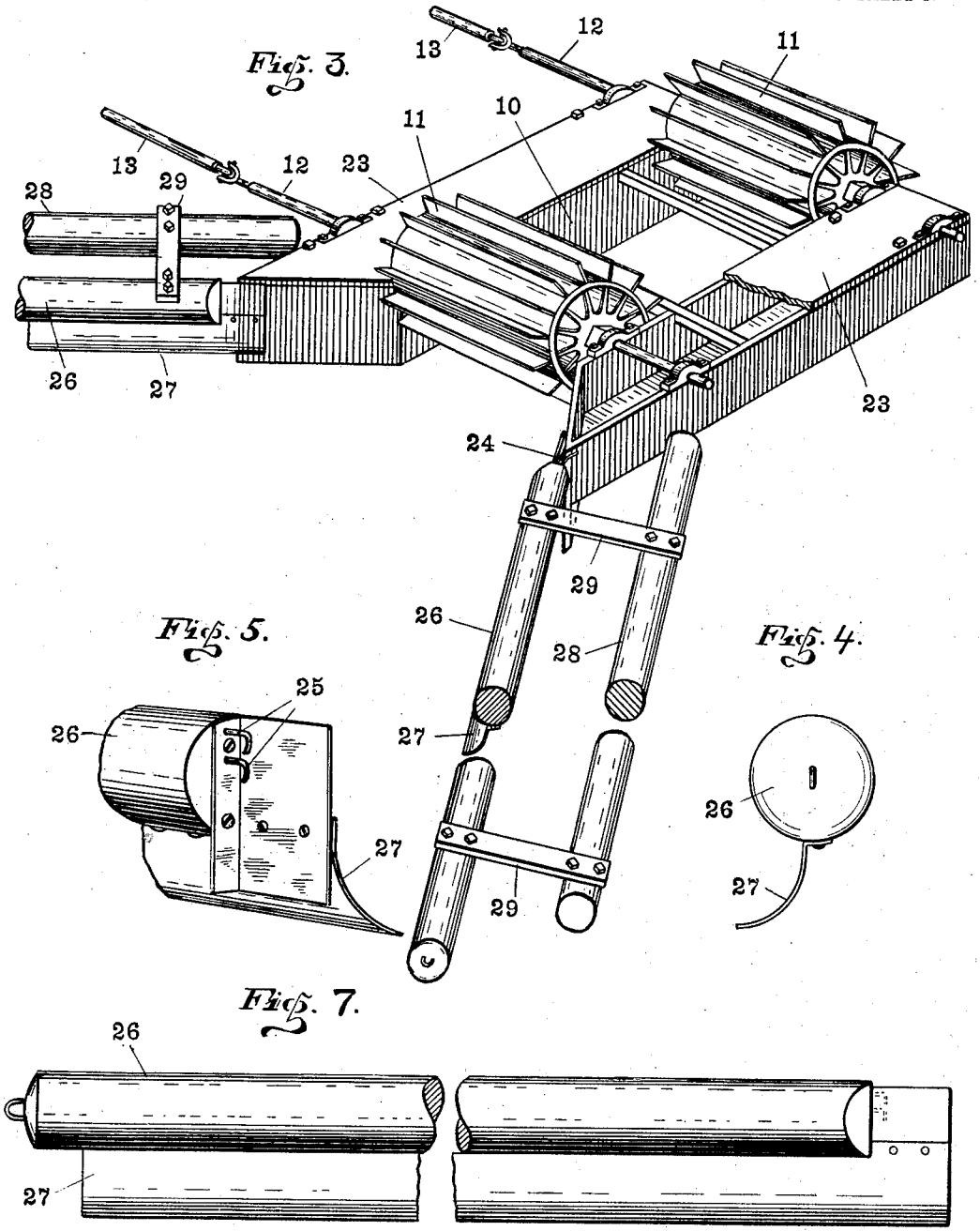

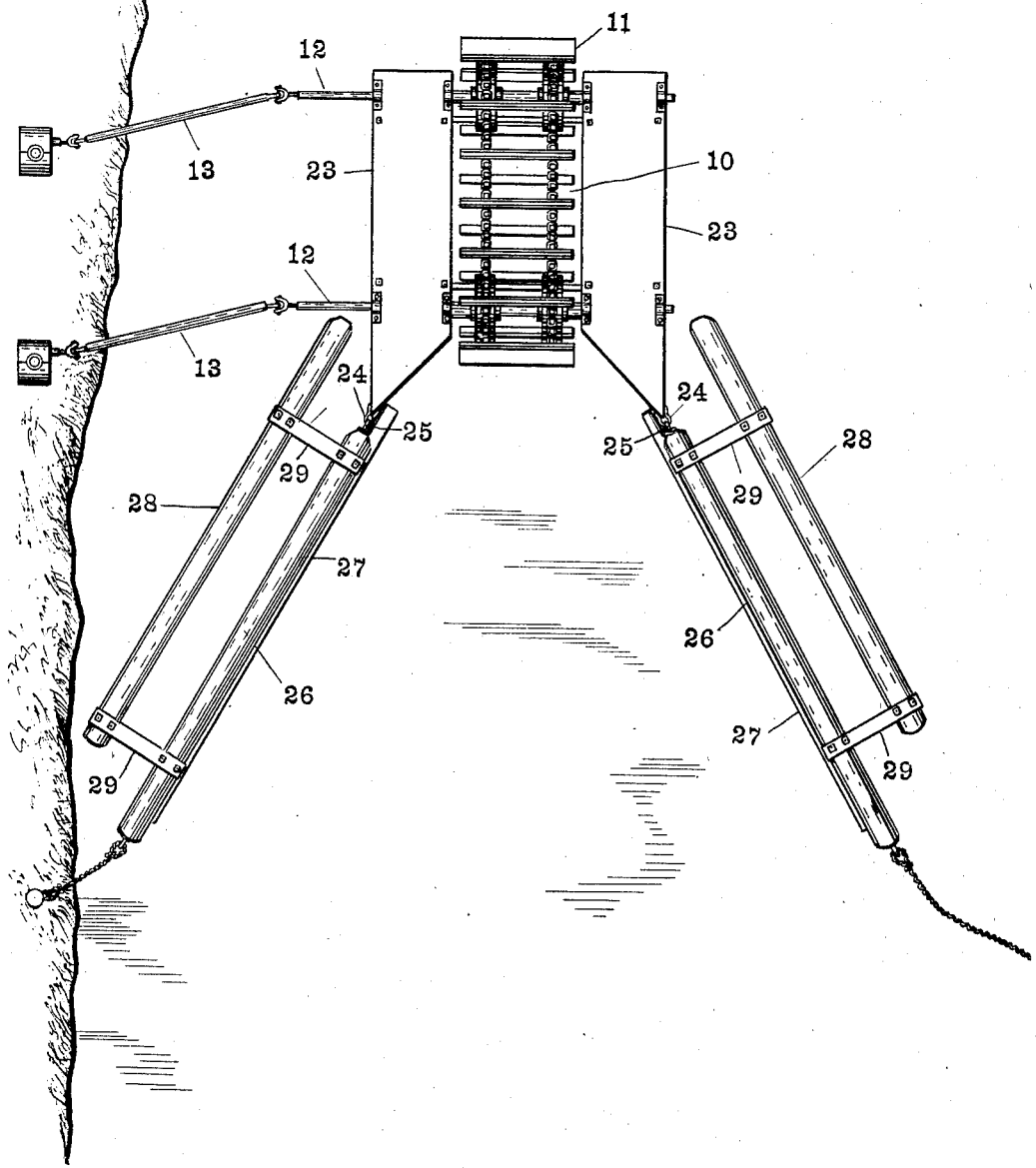

UNITED STATES PATENT OFFICE.

THEODORE F. GILLILAND, OF BLUFFTON, INDIANA.

PORTABLE POWER-DAM.

SPECIFICATION forming part of Letters Patent No. 757,909, dated April 19, 1904.

Application filed October 5, 1903. Serial No. 175,760. (No model.)

*To all whom it may concern:*

Be it known that I, THEODORE F. GILLILAND, a citizen of the United States, residing at Bluffton, in the county of Wells and State of Indiana, have invented certain new and useful Improvements in Portable Power-Dams, of which the following is a specification.

The object of my invention is to produce a device which can be placed in a natural stream and collect a portion of the water flowing therein and direct the same to undershot wheels from which power may be derived.

The accompanying drawings illustrate my invention.

Figure 1 is a longitudinal section; Fig. 2, a perspective detail of a part thereof; Fig. 3, a perspective view of a slightly-modified form; Fig. 4, an end elevation of the gathering-boom of the form shown in Fig. 3; Fig. 5, a perspective detail thereof; Fig. 6, a plan of the form shown in Fig. 3, and Fig. 7 a side elevation of the gathering-boom.

In the drawings, 10 indicates a floating sluiceway, within which is mounted an undershot water-wheel 11, (or any suitable form,) the shaft 12 of which is provided with universally-jointed sections 13, leading to the shore and connected to any desired mechanism to be driven. In the form shown in Figs. 1 and 2 the sluiceway 10 is provided with a bottom 14, to the rear end of which is hinged a gathering-trough consisting of a downwardly and rearwardly extending bottom 15 and the upwardly-extending sides 16, which extend up to a point practically even with the surface of the stream. Bottom 15 is of course wider at its rear end than at the end secured to the sluiceway, and the sides are stiffened by suitable stiffening-booms 17, which rest upon the surface of the water and are supported in part by suitable floats 18, secured thereto. Hinged to the rear edge of bottom 15 is a plate 19, adapted to rest upon the bottom of the stream. Any desired part of the water flowing down the stream is gathered by the gathering-trough and directed into the sluiceway, where the velocity of the water will be much greater than in the main portion of the stream, owing to the constricted dimensions of the sluiceway. The weight of the water within the gathering-trough will be considerable, and in order to prevent submergence of the sluiceway 10 I mount transverse stiffening-floats 20 beneath the bottom 15, the buoyant effect of which may be regulated by the introduction or eduction of water through suitable pipes 21. As many undershot wheels 11 may be arranged in the sluiceway as may be found desirable, as indicated in Figs. 3 and 6.

In the forms shown in Figs. 3 and 6 the sluiceway is formed between two floating pontoons 23 23, the rear ends of which diverge outwardly and are provided with suitable eyes 24. The eyes 24 are adapted to receive hooks 25, extending from the forward end of a gathering-boom 26, which is provided on its lower side with a depending flange 27. The flange 27 is held in an upright position by a supplemental boom 28, which floats upon the surface of the stream and connects by suitable cross-arms 29 with the boom 26. The booms 26 are moored to the shore by suitable chains, as shown in Fig. 6.

By means of the apparatus described I am enabled to utilize the natural power of ordinary running streams without the expense of construction of permanent dams and raceways.

I claim as my invention—

1. A portable power-dam consisting of a floating sluiceway composed of sides and bottom, a gathering-trough secured to the upstream end of said sluiceway and consisting of a downwardly and rearwardly extending bottom and upwardly-extending sides, and floats attached to said gathering-trough and adapted to partially support the weight thereof in operation.

2. A portable power-dam consisting of a floating sluiceway composed of sides and bottom, a gathering-trough secured to the upstream end of said sluiceway and consisting of a downwardly and rearwardly extending bottom and upwardly-extending sides, stiffening-booms along the upper edges of said sides, and transverse stiffening-floats 20 arranged beneath said downwardly and rearwardly extending bottom, substantially as and for the purpose set forth.

3. A portable power-dam consisting of a floating sluiceway, a gathering-trough secured to the upstream end of said sluiceway and consisting of a downwardly and rearwardly extending bottom and upwardly-extending sides and floats attached to said gathering-trough and adapted to partially support the weight thereof in operation.

4. A portable power-dam consisting of a floating sluiceway, a gathering-trough secured to the upstream end of said sluiceway and consisting of a downwardly and rearwardly extending bottom and upwardly-extending sides, stiffening-booms along the upper edges of said sides, and transverse stiffening-floats 20 arranged beneath said downwardly and rearwardly extending bottom, substantially as and for the purpose set forth.

5. A portable power-dam consisting of a floating sluiceway, a gathering-trough secured to the upstream end of said sluiceway and consisting of a downwardly and rearwardly extending bottom and upwardly-extending sides, and an extension pivoted to the upstream end of said bottom and adapted to lie upon the stream-bed.

6. A portable power-dam consisting of a floating sluiceway composed of sides and bottom, a gathering-trough secured to the upstream end of said sluiceway and consisting of a downwardly and rearwardly extending bottom and upwardly-extending sides, and stiffening-booms secured to the upper edges of said sides.

7. A portable power-dam consisting of a floating sluiceway composed of sides and bottom, a gathering-trough secured to the upstream end of said sluiceway and consisting of a downwardly and rearwardly extending bottom and upwardly-extending sides, stiffening-booms secured to the upper edges of said sides, and floats secured to said stiffening-booms, as and for the purpose set forth.

In witness whereof I have hereunto set my hand and seal, at Indianapolis, Indiana, this 1st day of October, A. D. 1903.

THEODORE F. GILLILAND. [L. S.]

Witnesses:
ARTHUR M. HOOD,
JAMES A. WALSH.